United States Patent [19]

Weberndörfer

[11] 3,862,169

[45] Jan. 21, 1975

[54] PRODUCTION OF 4-METHYLOXAZOLES

[75] Inventor: Volkmar Weberndörfer, Ludwigshafen, Germany

[73] Assignee: Badische Anilin- & Soda-Fabrik Aktiengesellschaft, Ludwigshafen/Rhein, Germany

[22] Filed: Oct. 16, 1972

[21] Appl. No.: 297,596

[30] Foreign Application Priority Data
Oct. 21, 1971 Germany............................ 2152367

[52] U.S. Cl...... 260/307 R, 260/295 R, 260/296 R, 260/297 R, 260/453 R
[51] Int. Cl............................................. C07d 85/44
[58] Field of Search ................................ 260/307 R

[56] References Cited
FOREIGN PATENTS OR APPLICATIONS
10,130   6/1964   Japan

*Primary Examiner*—Raymond V. Rush
*Attorney, Agent, or Firm*—Johnston, Keil, Thompson & Shurtleff

[57] ABSTRACT

Production of 4-methyloxazoles by cyclizing imino ethers of propargyl alcohols in the presence of metal salts. Compounds which can be prepared by the process of the invention are valuable starting materials for the production of dyes and plastics.

8 Claims, No Drawings

PRODUCTION OF 4-METHYLOXAZOLES

The invention relates to a process for the production of 4-methyloxazoles by cyclization of imino ethers of propargyl alcohols in the presence of metal salts.

It is known from German Published Application No. 1,915,232 that 4-methyloxazoles can be prepared by condensation of esters of propargyl alcohol with an organic ammonium salt or amide, preferably in the presence of a metal salt and a polyphosphoric acid. The ester grouping in 3-position to the triple bond is stated to be decisive for the reaction; according to this Published Application an analogous reaction does not take place when propyn-1-ol-3 is used instead of the esters.

Rodd reports the use of imino ethers as starting materials in "Chemistry of Carbon Compounds," Volume IVa, page 356, Elsevier Publishing Co., New York, 1957. These starting materials are first condensed using a troublesome procedure with glycine ester hydrochloride or an α-aminonitrile and the resulting reaction product is then converted into an oxazole in two further reaction stages. When benziminomethyl ether is reacted with the hydrochloride of an α-aminoketone, a mixture of the correspondingly substituted oxazole and imidazole is formed. In all these cases the ether bond of the imino ether has to be split and the oxygen atom of the acid amide intermediately formed has to react afresh with the reaction partner to the cyclic ether in the oxazole molecule. From the said publications it is evident that for the synthesis of the oxazole molecule the bonds of the nitrogen and of the oxygen have to be formed simultaneously with their adjacent carbon atoms in the ring, or else first that of the nitrogen and then that of the oxygen. These routes are in accord with those of other known oxazole syntheses (Rodd, loc. cit., pages 353 to 358).

None of these methods gives satisfactory yields of pure end product or is economical enough in industrial operation.

It is the object of the invention to prepare 4-methyloxazoles in higher yields and purity, particularly on an industrial scale, more economically and at higher reaction rates.

We have now found that a 4-methyloxazole of the general formula (I):

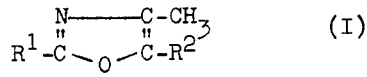

where $R^1$ and $R^2$ are identical or different aliphatic or aromatic radicals, and $R^2$ may also be hydrogen and/or $R^1$ may also be a cycloaliphatic or araliphatic radical is advantageously obtained by cyclizing an iminoether of a propargyl alcohol of the general formula (II):

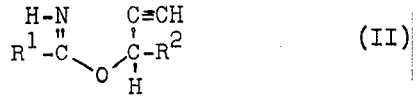

where $R^1$ and $R^2$ have the meanings given above in the presence of a salt of a metal of Group Ib, IIb or VIIIb of the Periodic Table.

The reaction may be represented as follows when propioniminopropargyl ether is used:

As compared with prior art methods, the process according to the invention produces 4-methyloxazoles in higher yields and purity, particularly on an industrial scale, more economically and at a higher reaction velocity. The troublesome production of the propargyl ester and an imino ether as starting materials, whose ester and ether groups have to be eliminated again in the reaction, is avoided. In contrast to the method according to the said Published Application, polyphosphoric acid is not required and this considerably simplifiers working up of the reaction mixture. All these advantageous results are surprising having regard to the state of the art and the decomposability and reactivity of iminoethers (cf. Rodd, loc. cit., Volume Ia, page 607).

The starting materials (II) may be prepared in a conventional manner, for example by reaction of a nitrile with the appropriate propargyl alcohol (cf. Rodd, loc. cit., Volume I). Preferred starting materials (II) and accordingly preferred end products (I) are those in which $R^1$ and $R^2$ are identical or different alkyls of one to eighteen, particularly one to four, carbon atoms or a phenyl radical, or $R^2$ may be hydrogen and/or $R^1$ may be cycloalkyl of five to eight carbon atoms or aralkyl of seven to twelve carbon atoms. The alkyl radicals may be linear or branched. The said radicals may also bear, as substituents, groups and/or atoms which are inert under the reaction conditions, for example chlorine atoms; hydroxyl groups; alkyl, dialkylamino, carbalkoxy or alkoxy groups having in each case one to four carbon atoms per alkyl group; acyloxy groups of one to four carbon atoms; five-membered or six-membered heterocyclic radicals, particularly those having a nitrogen atom and/or an oxygen atom in the heterocyclic ring.

The following are examples of iminoethers suitable as starting materials (II): the imino propargyl ethers of propionic, acetic, stearic, 1-methylnorbornane-1-carboxylic, valeric, pivalic, 3-hydroxypivalic, cyclohexylcarboxylic, benzoic, phenylacetic, p-toluacetic, p-hydroxybenzoic, o-methyoxybenzoic, 2-methyl-2-hydroxybutyric, γ-chlorobutyric, p-diethylaminobenzoic, p-carbomethoxybenzoic, 2-acetoxyacetic, pyridine α-acetic, and furfurylacetic acids and the analogous butyn-(1)-3-ol, pentyn-(1)-3-ol and propargyl-3-ol benzene ethers.

It is preferred to use silver, mercury, copper, zinc, cadmium, iron and nickel salts as catalysts. The catalysts may be salts of inorganic or organic acids and are generally used in an amount of from 0.01 to 30 percent molar, preferably from 0.5 to 10 percent molar, per mole of starting material (II). The salts of the following acids may be used with advantage: mineral acids such as sulfuric acid, phosphoric acid and nitric acid; hydrogen halides such as hydrochloric acid; boric acid; cycloaliphatic or araliphatic acids such as cyclohexanecarboxylic acid, benzoic acid, phenylacetic acid; advantageously sulfonic acids such as benzenesulfonic acid and toluenesulfonic acid; or aliphatic carboxylic acids, particularly those of one to six carbon atoms such as chloroacetic acid, acrylic acid, oxalic acid, formic acid, acetic acid, propionic acid, adipic acid and maleic acid.

Cyclization is carried out as a rule at a temperature of from 30° to 250°C, preferably at from 100° to 200°C, at atmospheric or superatmospheric pressure, continuously or batchwise. Organic solvents which are inert under reaction conditions may be used, such as aliphatic hydrocarbons, for example ligroin; aromatic hydrocarbons, for example benzene and toluene; chlorohydrocarbons, for example methylene chloride and trichloroethylene; organic acids, for example acetic acid, propionic acid and isobutyric acid; nitriles, for example acetonitrile and benzonitrile; or mixtures thereof. As a rule, amounts of from 10 to 300 percent by weight, based on starting material (II), are suitable.

In those cases where the end product (I) combines with the metal salt used as catalyst to form a complex, the end product may be used as solvent for the catalyst. The catalyst is thus first dissolved in the corresponding 4-methyloxazole, advantageously in an amount of from 2 to 10 moles of end product (I) per mole of metal salt, and the solution formed is added to the starting mixture or placed in the reactor prior to the addition of the components. Cyclization may be carried out as follows: A mixture of starting material (II), catalyst and solvent (when used) is kept at the reaction temperature for from 10 seconds to 6 hours. The mixture may be prepared in a variety of ways; it is advantageous to place a small portion of the catalyst, if desired dissolved in an appropriate amount of solvent (advantageously end product (I)), in the reactor at the reaction temperature and then to add the starting material (II) simultaneously with the remainder of the catalyst. The end product is then separated from the reaction mixture by a conventional method, for example by fractional distillation.

Compounds which can be prepared by the process of the invention are valuable starting materials for the production of dyes and plastics. They may also be used to extract metal ions from aqueous solutions. For example, after 10 parts of a 0.1-normal solution of $AgNO_3$ has been shaken twice with 5 parts of 2-benzyl-4-methyloxazole in 5 parts of methylene chloride, no $AG^+$ ions can be detected as silver chloride in the aqueous phase. Similarly, the end products (I) may be converted by reaction with acetylene compounds with elimination of nitriles to into furans which as chrysanthemates exhibit particularly advantageous insecticidal activity. Reference is made to the above-mentioned publications for further information concerning use of these compounds. For example, the German published application No. 1,915,232 describes substituted oxazoles bearing as substituents in the 2-, 4-, and/or 5- positions alkyl, alkenyl, aryl, cycloalkyl, heterocyclic radicals, and the like; uses of such oxazoles including intermediate products in the production of dyestuffs and plastics; and conversion of such oxazoles through reaction with ammonia to produce imidazoles and thereby also the basic or raw material for the production of copolymers of vinyl imidazoline, especially with acrylic esters.

The following Examples in which parts are by weight illustrate the invention. Parts by weight bear the same relation to parts by volume as the kilogram to the liter.

EXAMPLE 1

2-ethyl-4-methyloxazole 23.7 parts of propioniminopropargyl ether is contained in a first container and a solution of 0.5 parts of silver tosylate and 3.0 parts of 2-ethyl-4-methyloxazole is contained in a second container. 1 part by volume of catalyst solution is placed in a reactor and heated to 110°C. The contents of the two containers are then allowed to flow in uniformly in the course of 30 minutes, the reaction temperature of being kept at 100° to 110°C by cooling. The mixture is allowed to react for another thirty minutes after all has been added. The mixture is then subjected to fractional distillation without prior separation of the catalyst. 24.0 parts of 2-ethyl-4-methyloxazole is obtained which has a boiling point of 124° to 126°C. After deduction of the 3 parts of oxazole introduced at the start, the yield is 21.0 parts, equivalent to 88.6 percent of theory.

EXAMPLE 2

2-benzyl-4-methyloxazole

The reaction is carried out as described in Example 1 but at a temperature of 200°C and with 170 parts of crude phenylacetiminopropargyl ether (93.1 percent by weight) and 2.5 parts of silver tosylate (dissolved in 12 parts of 2-benzyl-4-methyloxazole). 157.2 parts (97.3 percent of theory) of 2-benzyl-4-methyloxazole is obtained having a boiling point of 256°C or of 79° to 80°C at 0.3 mm Hg.

EXAMPLE 3

2-phenyl-4-methyloxazole

The reaction is carried out as described in Example 1 but at a temperature of from 110° to 120°C and with 10.0 parts of crude benzoiminopropargyl ether (97.75 percent by weight) and 0.3 part of silver tosylate (dissolved in 2.0 parts of 2-phenyl-4-methyloxazole). 9.4 parts (96.2 percent of theory) of 2-phenyl-4-methyloxazole is obtained having a boiling point 59°C at 0.3 mm Hg.

EXAMPLE 4

2,4,5-trimethyloxazole

The reaction is carried out as described in Example 1 but at a temperature of from 110° to 120°C and with 8.45 parts of acetiminobutyn-1-ol-3 and 0.4 parts of silver tosylate (dissolved in 2.0 parts of 2-benzyl-4-methyloxazole). 8.1 parts (94 percent of theory) of 2,4,5-trimethyloxazole is obtained having a boiling point of 133°C at 760 mm Hg. The 2-benzyl-4-methyloxazole used for dissolving the catalyst may be recovered quantitatively.

EXAMPLE 5

2-(2'-hydroxybutyl-2')-4-methyloxazole

The reaction is carried out as described in Example 1 but at a temperature of from 130° to 140°C and with 30.0 parts of 2-methyl-2-hydroxybutyriminopropargyl ether having a melting point of 73° To 74°C and 2.0 parts of silver tosylate (dissolved in 10 parts by volume of 2-ethyl-4-methyloxazole). 26.5 parts (86.2 percent of theory) of 2-(2'-hydroxybutyl-2')-4-methyloxazole is obtained having a boiling point of 218°C.

EXAMPLE 6

2-benzyl-4-methyloxazole

A solution of 60.0 parts by volume of glacial acetic acid and 1.92 parts of mercury acetate is refluxed in a reactor. Without further heating, 60.0 parts of phenylacetiminopropargyl ether is introduced into the mixture over a period of 30 minutes. As a result of the heat of reaction liberated the solution remains under reflux. After all has been introduced, the mixture is kept for another 30 minutes at 110° to 120°C. The mixture is distilled through a column without further processing. The glacial acetic acid is separated at 100 mm Hg and then 55.3 parts (91.3 percent of theory) of 2-benzyl-4-methyloxazole is obtained at 60°C and 1 mm Hg.

EXAMPLE 7

2-heptadecanyl-4-methyloxazole 0.1 part of silver tosylate and 5 parts by volume of dry methylene chloride are heated under reflux in a reactor. 4.1 parts of stearyliminopropargyl ether (99.8 percent by weight) dissolved in 10 parts by volume of methylene chloride is then added in the course of five minutes. The mixture is kept at reflux temperature (40°C) for another 30 minutes, the solvent is removed and the residue is distilled. 3.8 parts (92 percent of theory) of 2-heptadecanyl-4-methyloxazole is obtained at 155° to 160°C and 0.1 mm Hg.

EXAMPLE 8

2-(3'-chloropropyl)-4,5-dimethyloxazole 34.7 parts of γ-chlorobutyrimino-1-butyn-3-ol ether is dissolved in 200 parts by volume of methylene chloride. 1 part of silver tosylate is added in one batch to the resulting solution in a reactor. The solution becomes dark in color and reacts with vigorous boiling. After it has stood overnight, the insoluble solid is filtered off, the solvent is distilled off from the filtrate and the residue is kept for another 20 minutes at 80°C. In a subsequent distillation at 2.0 mm Hg 30.9 parts (89 percent of theory) of 2-(3-chloropropyl)-4,5-dimethyloxazole is obtained at from 76° to 87°C.

EXAMPLE 9

2-(1-methylnorbornyl)-4-methyloxazole 4.6 parts of 1-methylnorbornane-1-carboximinopropargyl ether is allowed to flow at 110°C into a mixture of 20 parts of glacial acetic acid and 0.4 parts of silver tosylate. The mixture is kept at the same temperature for another 30 minutes and is then added to an excess of ammonia (14 percent by weight). The end product is extracted three times, each time 10 parts of ligroin (boiling point 40° to 80°C). After the ligroin has been removed, 3.5 parts (76 percent of theory) of 2-(1-methylnorbornyl)-4-methyloxazole is obtained having a boiling point of 48° to 50°C at 0.1 mm Hg.

I claim:

1. A process for the production of a 4-methyloxazole of the formula:

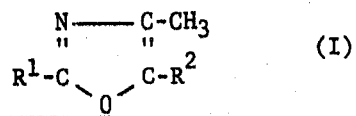

(I)

wherein $R^1$ is alkyl of one to 18 carbon atoms, phenyl, cycloalkyl of five to eight carbon atoms, aralkyl of seven to 12 carbon atoms, or one of said radicals bearing a substituent which is inert under the reaction conditions of the process, said substituent being chlorine, hydroxyl, alkyl with one to four carbon atoms, dialkylamino with one to four carbon atoms per alkyl group, carbalkoxy with one to four carbon atoms in the alkoxy group, alkoxy with one to four carbon atoms, or acyloxy with one to four carbon atoms; $R^2$ is hydrogen, alkyl of one to 18 carbon atoms, phenyl, or either said alkyl or phenyl respectively bearing a substituent which is inert under the reaction conditions of the process, said substituent being chlorine, hydroxyl, alkyl with one to four carbon atoms, dialkylamino with one to four carbon atoms per alkyl group, carbalkoxy with one to four carbon atoms in the alkoxy group, alkoxy with one to four carbon atoms, or acyloxy with one to four carbon atoms, wherein an imino ether of a propargyl alcohol of the formula:

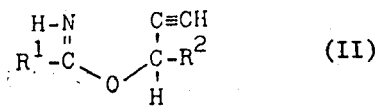

(II)

where $R^1$ and $R^2$ have the meanings given above is cyclized in the presence of a catalytic amount of a silver, mercury, copper, zinc or cadmium salt of sulfuric acid, phosphoric acid, nitric acid, hydrochloric acid, boric acid, cyclohexanecarboxylic acid, benzoic acid, phenylacetic acid, benzenesulfonic acid, toluenesulfonic acid, chloroacetic acid, acrylic acid, oxalic acid, formic acid, acetic acid, propionic acid, adipic acid or maleic acid at a temperature of from 30° to 2502 C.

2. A process as claimed in claim 1 wherein the cyclization is carried out with an amount of from 0.01 to 30 percent molar of catalyst per mole of starting material (II).

3. A process as claimed in claim 1 wherein the cyclization is carried out with an amount of from 0.5 to 10 percent molar of catalyst per mole of starting material (II).

4. A process as claimed in claim 1 wherein the cyclization is carried out at a temperature of from 100° to 200°C.

5. A process as claimed in claim 1 wherein the cyclization is carried out in 10–300 percent by weight, based on starting material (II), of an organic solvent which is inert under the reaction conditions.

6. A process as claimed in claim 1 wherein said imino ether is a imino propargyl ether of propionic, acetic, stearic, 1-methylnorbornane-1-carboxylic, valeric, pivalic, 3-hydroxypivalic, cyclohexylcarboxylic, benzoic, phenylacetic, p-toluylacetic, p-hydroxybenzoic, o-methoxybenzoic, 2-methyl-2-hydroxybutyric, γ-chlorobutyric, p-diethylaminobenzoic, p-carbomethoxybenzoic, or 2-acetoxyacetic acid or the butyn-(1)-3-ol, pentyn-(1)-3-ol or propargyl-3-ol imino ether of one of said acids.

7. A process as claimed in claim 1 wherein said salt is silver tosylate or mercury acetate.

8. A process as claimed in claim 2 wherein a mixture of said imino ether and said salt is maintained at said temperature of 30°–250°C for 10 seconds to 6 hours, and said mixture is prepared by placing a small portion of said salt in the reaction vessel for the process at said reaction temperature and thereafter said imino ether and the remainder of said catalyst are added simultaneously to the reaction vessel.

* * * * *

UNITED STATES PATENT OFFICE
CERTIFICATE OF CORRECTION

PATENT NO. : 3,862,169
DATED : January 21, 1975
INVENTOR(S) : Weberndorfer

It is certified that error appears in the above-identified patent and that said Letters Patent are hereby corrected as shown below:

In Column 3, Line 21, start new paragraph beginning with the word "cyclization"

In Column 3, Line 66, delete "0.5 parts" and substitute --0.5 part--

In Column 4, Line 29, insert "of" after "boiling point"

In Column 6, Line 27, delete "2502 C." and substitute --250° C.--

Signed and Sealed this twenty-ninth Day of June 1976

[SEAL]

Attest:

RUTH C. MASON
Attesting Officer

C. MARSHALL DANN
Commissioner of Patents and Trademarks